March 3, 1970 K. R. LARSON 3,498,103
DEAD WEIGHT CHECKING ATTACHMENT FOR CALIBRATED
TORQUE WRENCH TESTING APPARATUS
Filed Nov. 27, 1967 2 Sheets-Sheet 2
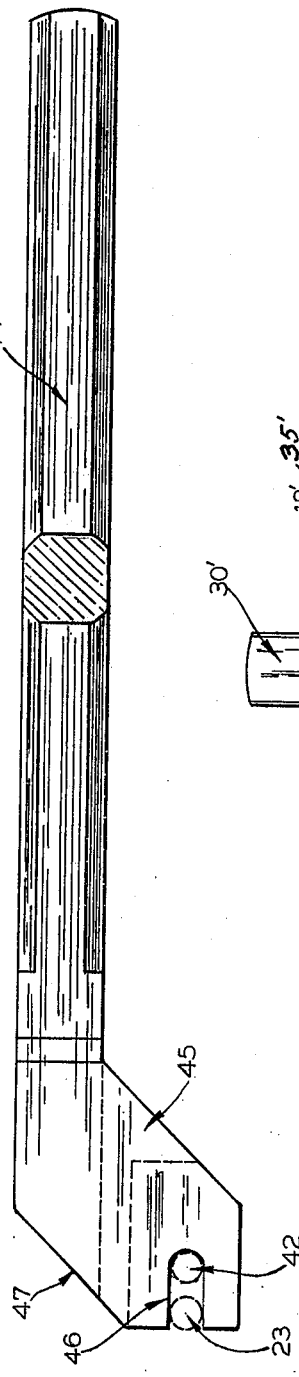
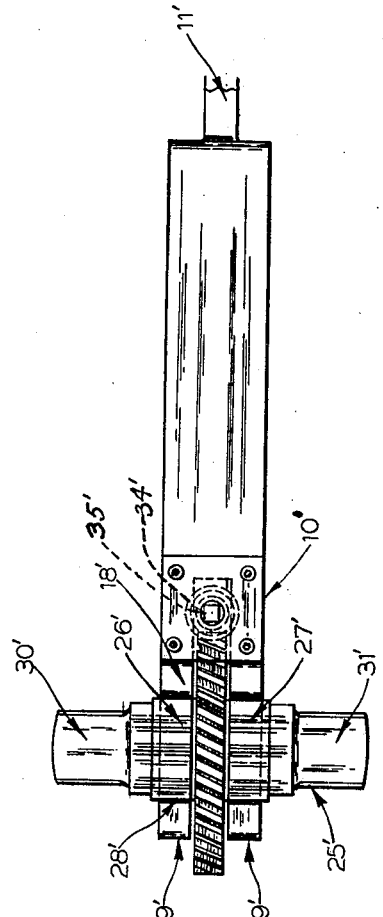
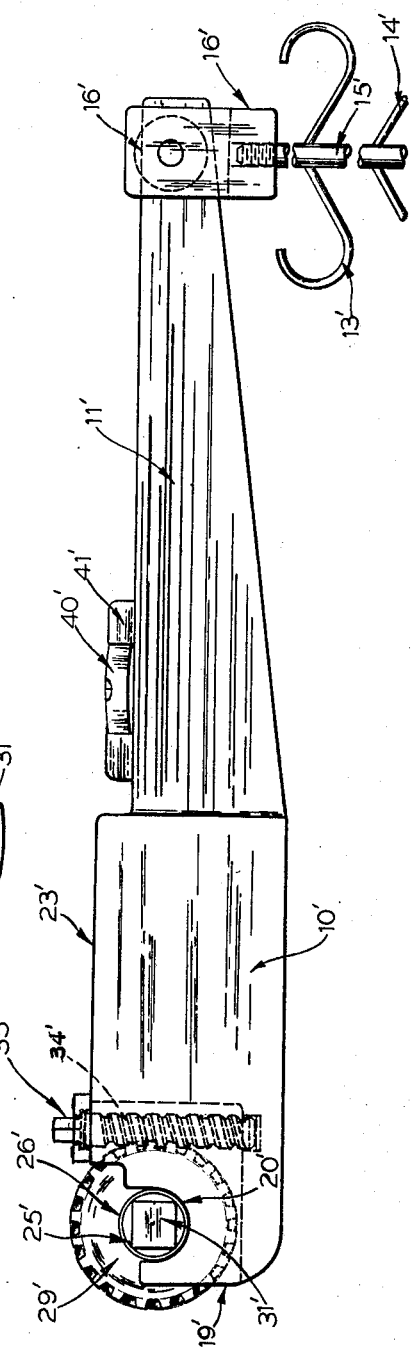
INVENTOR.
KENNETH R. LARSON
BY Harry C. Roberts
ATTORNEY United States Patent Office 3,498,103
Patented Mar. 3, 1970

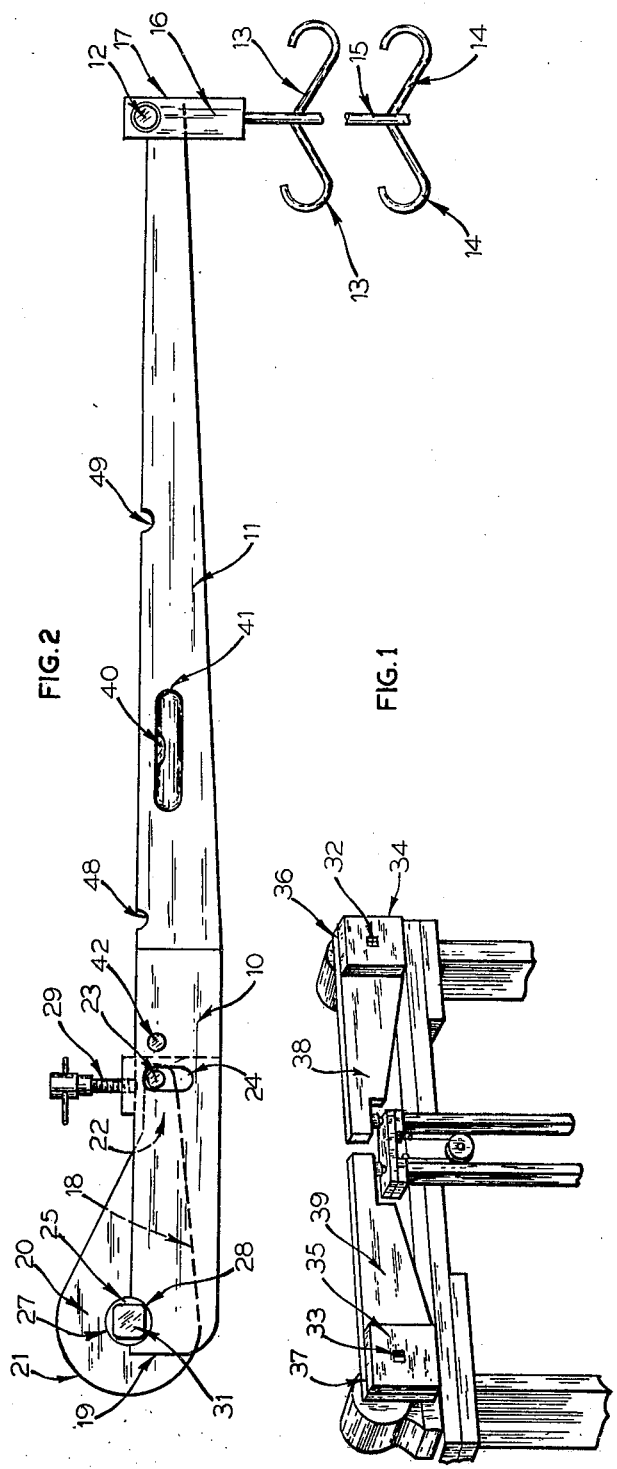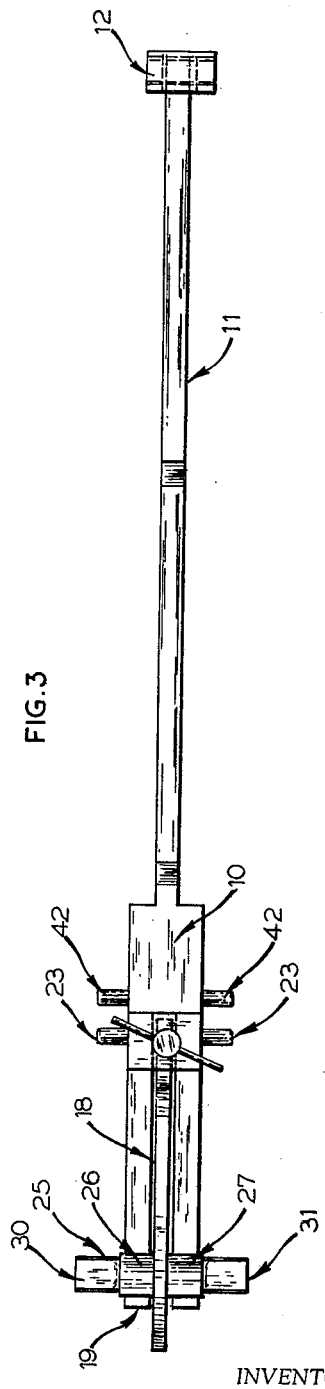
INVENTOR.
KENNETH R. LARSON
BY
ATTORNEY

3,498,103
DEAD WEIGHT CHECKING ATTACHMENT FOR CALIBRATED TORQUE WRENCH TESTING APPARATUS
Kenneth R. Larson, Des Plaines, Ill., assignor to Snap-On Tools Corporation, Kenosha, Wis., a corporation of Delaware
Filed Nov. 27, 1967, Ser. No. 685,881
Int. Cl. G01l 25/00
U.S. Cl. 73—1                                                                7 Claims

ABSTRACT OF THE DISCLOSURE

An apparatus for testing torque wrench calibrators or other torque measuring devices. A beam or arm is provided with means for attaching it to the torque measuring device in a horizontal position and hooks for attaching known weights to the beam at fixed positions. A spirit level is mounted on the beam and means are provided for incrementally adjusting the beam to horizontal regardless of the position of the beam attaching means.

---

This invention relates to checking devices for testers and more particularly to dead weight accuracy testers for measuring checking devices of the type described or intended to be described in U.S. Letters Patent No. 3,255,624 dated June 24, 1966.

It contemplates more especially the provision of novel attachments for utilizing accurate dead weight counterbalancing testers to double check the accuracy of testers for torque measuring wrenches or other measuring instruments which require constant checking to determine their accuracy and initial calibration at their point of production.

This involves the use of readily attachable and detachable dead weight support members in connection with testers having provision for torque wrench or other measuring instrument testing application. These are substituted for the measuring instruments in order to support accurate dead weights which are rendered comparable to the calibrated indicating mechanism comprising part of the testers. These comparisons can be readily made, and preferably provision is made to adjust the dead weight support members so that their initial setting (without dead weights) will correspond to the zero reading on the testers' calibrated indicating mechanism.

One object of the present invention is to provide simple and dependable tester accuracy checking attachments for measuring instrument testers.

Another object is to provide simple and readily attachable and detachable dead weight support arms for use in checking the accuracy of measuring instrument testers.

Still another object is to provide dead weight support arms with initial adjusting expedients for use with measuring instrument testers to determine their accuracy for testing purposes.

A further object is to provide dead weight support arms with initial position controls for substitution in place of measuring instruments on testers therefor for comparative accuracy checking.

Still a further object is to provide dead weight support arms for ready attachment and detachment to testers of the type described in Letters Patent No. 3,255,624 dated June 24, 1966.

A still further object of the present invention is to provide dead weight support arms for checking testers with levelling controls therefor to enable initial zero adjustment relative to testing measuring instrumentalities.

Other objects and advantages will appear from the following description of an illustrated embodiment of the present invention.

In the drawings:

FIGURE 1 is a fragmentary perspective view of testing equipment to which dead weight checking arms are rendered attachable and detachable for checking purposes against dead weights.

FIGURE 2 is a front view in elevation of a dead weight support arm embodying features of the present invention.

FIGURE 3 is a plan view of the support arm shown in FIGURE 2 with the dead weight attachment removed from the end thereof.

FIGURE 4 is a perspective view of a prying tool used to align the fulcrum pins of the weight support arms shown in FIGURE 3.

FIGURE 5 is a front view in elevation of a modified adjustable support arm similar to the view shown in FIGURE 4.

FIGURE 6 is a fragmentary plan view of the support arm shown in FIGURE 5.

The structure selected for illustration is not intended to serve as a limitation upon the scope or teachings of the invention, but is merely illustrative thereof. There may be considerable variations and adaptations of all or part of the teachings thereof depending upon the dictates of commercial practice. The present invention comprises an elongated flat arm member 10 provided with a rectilinear shank member 11 extending in a reduced thickness for a substantial distance at least twice the length of the arm member 10. The shank member 11 terminates in a transversely projecting stub trunnion 12 to which weight supporting hooks 13–14 attached by means of a rod 15 vertically anchored into and depending from a bracket 16. The bracket 16 is appropriately slotted as at 17 to render such complemental and readily attachable to the oppositely projecting trunnion 12 anchored proximate to the end of the arm shank 11.

The arm member 10 is longitudinally slotted as at 18 to communicate with the edge 19 to loosely accommodate a plate 20 having a circular portion 21 extending laterally to terminate in a reduced lever 22 which carries an oppositely projecting trunnion 23 proximate to the end thereof. The trunnion 23 rides in vertically elongated and aligned slots 24 provided in the furcations of the arm 10 defined by the elongated slot 18 therein. While the plate 20 rides at its lever end in the trunnion 23 and slot 24 of the arm member 10, its circular portion 21 is rotatingly supported by an axially disposed stub shaft 25 having peripheral bearing shoulders 26–27 that are supported in semi-circular grooves 28 aligned in the upper edges of the furcations of the arm 10.

In order to tilt the elongated arm-shank members 10–11 to initially adjust and balance such to arrive at a zero reading on the tester to be checked, a finger manipulating machine screw 29 is provided downwardly through the upper edge of the arm member 10 in substantial alignment with the plate lever trunnion 23 to raise or lower the arm-shank members 10–11 which will balance the latter and operate as a rigid elongated rectilinear unit to insure an initial zero reading on the calibrated indicating mechanism (not shown) on the tester to be checked (FIGURE 1). As shown, the stub shaft 25 terminates in oppositely extending geometrically shaped ends 30–31 to register with complementably shaped recesses 32–33 provided in the end plates 34–35 welded or otherwise attached to the ends 36–37 of the tester machine arms 38–39 (FIGURE 1) described in detail in my Letters Patent No. 3,255,624, referred to supra.

A liquid bubble lever 40 is fitted to an elongated slot 41 in the dead weight checking arm-shank members 10–11 (FIGURE 2), and this cooperates with the level adjusting screw 29 to provide for the quick positioning of the arm-shank 10–11. The oppositely extending geometrically shaped stub shaft ends 30–31 enable the arm-shank 10–11 to be applied to either testing arm 38 or 39 depending upon the directional rotary movement to be applied in the tester checking operation. Another trunnion 42 extends through the arm 10 proximate to but spaced from the trunnion 23 and substantially in horizontal alignment therewith to serve as a fulcrum to prebalance the arm-shank members 10–11 on a stationary support V-groove (not shown) with the aid of the bubble level 40. This enables the arm-shank members 10–11, although segmental complementary elements, to operate downwardly or in a clockwise direction (viewed from FIGURE 2) as an elongated rigid rectilinear unit.

A pry bar 43 (FIGURE 4) may be provided with an elongated arm 44 which is provided with an offset head 45 having an elongated groove 46 in the face 47 thereof. The groove 46 is sufficiently deep to accommodate the aligned fulcrum pins 23–42 (FIGURES 2 and 4) and to insure their initial alignment. Semi-circular cross-grooves 48–49, in this instance two, are equidistantly spaced along the arm-shank member 11. These are preferably one and two feet or six and twelve inches from the center of the stub shaft 25 in order to apply dead weights thereto at precise moment arm lengths to increase the check test capacity of the arm-shank members 10–11.

In the modified embodiment illustrated in FIGURES 5 and 6, the adjusting means for the plate 20' with its stub-shaft 25' having enlarged bearings 26' and 27' for journalled support in semi-circular recesses 28' in the upper edge of the arm member 10' which is provided with the elongated longitudinal slot 18' providing a bifurcated portion to receive the large circular worm wheel 29' attached to the plate 20'. The worm wheel 29' meshes with an elongated worm 34' vertically journalled in the arm member 10' in alignment therewith. A square driven extremity 35' on the worm 34', enables the application of a suitable wrench thereto to turn the worm 34' with its worm wheel 29' to adjust the tilt of the arm-shank members 10'–11' that operate as a rigid unit. As in the prior embodiment, a bubble level 40' is attached with end brackets 41' to the top edge of the arm-shank members 11' to assist in the initial levelling thereof.

With this construction and arrangement, a dead weight arm support may be applied to a tester such as illustrated in part in FIGURE 1 and U.S. Letters Patent No. 3,255,624 to check the accuracy of the tester by comparing the dead weight load with the reading on the tester indicating calibrated mechanism. This is a simple and effective checking mechanism and attachment.

I claim:
1. An accuracy checking device for precision calibrated testing apparatus including an actuatable response member, comprising a readily attachable and detachable rectilinear arm member and an elongated shank member extension thereon for operative positioning and functioning as a rigid unit relative to said actuatable responsive member of the precision calibrated testing apparatus to which said arm member is attached, said arm and shank members consisting of relatively movable bearing hub and shank members complemental to each other for limited angular relative adjustment to operate as a rigid unit, and means on said shank member to provide a known weighted moment arm load on said testing responsive actuatable arm to compare the load values on each of said members for accuracy checking purposes.

2. An accuracy checking device defined in claim 1 wherein screw means and stops are provided between said angularly related arm and said shank members to maintain them in their predetermined adjusted relation.

3. An accuracy checking device defined in claim 2 wherein said shank member is provided with indexed positions for supporting said dead weight suspension means at anyone of said indexed positions.

4. An accuracy checking device defined in claim 3 wherein said complementary hub bearing arm and shank members are provided with increment interengaging means for pivotally adjusting their relative initial position to procure an initial zero reading.

5. An accuracy checking device defined in claim 3 wherein said pivotal hub bearing and said arm member have complemental guide elements to maintain them in adjusted relation and provide displacement between maximum and minimum limits defined by said guide means.

6. An accuracy checking device defined in claim 5 wherein interengaging complemental trunnions and recesses are provided between said arm and shank members for limited angular relative adjustment determined by said levelling means for initial zero positioning comparable to said actuatable responsive member of the testing apparatus.

7. An accuracy checking device for precision calibrated testing apparatus including an actuatable responsive member, comprising a readily attachable and detachable rectilinear arm member and an elongated shank member extension thereon for operative positioning and functioning as a rigid unit relative to said actuatable responsive member of the precision calibrated testing apparatus to which said arm member is attached, said rectilinear arm and shank members being pivotally mounted with respect to each other, means provided between said rectilinear arm and shank members to adjust their angular relationship to an initial level unloaded zero shank member position, and means on said shank member to provide a known weighted moment arm load on said testing responsive actuatable arm to compare the load values on each of said members for accuracy checking purposes.

References Cited
UNITED STATES PATENTS

| | | | |
|---|---|---|---|
| 1,619,122 | 3/1927 | Hem | 73—1 |
| 2,909,055 | 10/1959 | Fish | 73—1 |
| 3,050,978 | 8/1962 | Livermont | 73—1 |

S. CLEMENT SWISHER, Primary Examiner